United States Patent [19]
Kirchmayr

[11] 3,875,178
[45] Apr. 1, 1975

[54] UPSILON-TRIAZOLE COMPOUNDS POSSESSING A MODIFIED METHYL GROUP IN THE 4-POSITION

[75] Inventor: Rudolf Kirchmayr, Binningen, Switzerland

[73] Assignee: Ciba-Geigy AG, Basel, Switzerland

[22] Filed: Mar. 17, 1971

[21] Appl. No.: 125,383

[30] Foreign Application Priority Data
Mar. 23, 1970 Switzerland.......................... 4320/70

[52] U.S. Cl.. 260/308 A, 260/293.69, 260/247.2 B, 252/301.2 W, 8/1 W
[51] Int. Cl............................................. C07d 55/02
[58] Field of Search................................ 260/308 A

[56] References Cited
UNITED STATES PATENTS

| | | |
|---|---|---|
| 3,542,689 | 11/1970 | Kirchmayr et al............. 260/308 A |
| 3,646,052 | 2/1972 | Neuner et al...................... 260/308 |
| 3,646,054 | 2/1972 | Kirchmayr et al............. 260/308 A |

OTHER PUBLICATIONS

Elderfield, Vol. 1, Heterocycle compounds, John Wiley & Sons, N.Y. Inc., pp. 406, 411, 421, 444, 445, 447, 487, 495, 496.
Elderfield, Vol. 7, Heterocyclic Compounds, John Wiley & Sons, N.Y. Inc., pp. 410, 411, 412, 413, 420 and 421.
Markgraf et al., J. Am. Chem. Soc., Vol. 85, pp. 958–961 (1963).
Traynelis et al., J. Am. Chem. Soc., Vol. 80, pp. 6590–6593 (1958).

Itai et al., Chemical Plarm. Bull., Vol. 11, pp. 1146–1150 (1963).

*Primary Examiner*—John M. Ford
*Attorney, Agent, or Firm*—Joseph G. Kolodny; Edward McC. Roberts; Prabodh I. Almaula

[57] ABSTRACT

The present invention relates to new v-triazoles of the formula

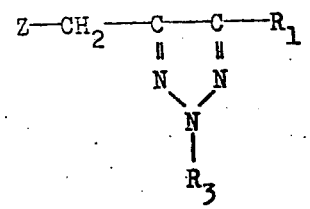

wherein Z denotes hydroxyl, benzoxy which is optionally substituted by alkyl or alkoxy with 1 to 4 carbon atoms or by halogen, alkanoyloxy with 1 to 4 carbon atoms, alkoxy or alkylmercapto with 1 to 4 carbon atoms, a dialkylamino radical with 1 to 4 carbon atoms per alkyl part, a morpholino or piperidino radical which is optionally substituted by methyl, or a dialkylphosphono radical with 1 to 4 carbon atoms per alkyl part, $R_1$ denotes alkyl with 1 to 4 carbon atoms, or phenyl which is optionally substituted by alkyl or alkoxy with 1 to 4 carbon atoms or by halogen, and $R_3$ denotes a 3-phenylcoumarinyl-(7) group, of which the phenyl group optionally contains non-chromophoric substituents. These v-triazoles serve as optical brighteners.

6 Claims, No Drawings

UPSILON-TRIAZOLE COMPOUNDS POSSESSING A MODIFIED METHYL GROUP IN THE 4-POSITION

The present invention relates to new v-triazole compounds which possess, in the 4-position, a modified methyl group, such as, for example, an esterified methylol group which can easily be converted, by saponification and further known reactions, into another modified methyl group, as well as to their use. Depending on the substituents of the v-triazole ring, the compounds manufactured according to the process of the invention serve as intermediate products for industrially usable compounds, or are already end products, especially optical brighteners.

The present invention in particular also relates to a new and inventive process for the manufacture of the v-triazoles, possessing an esterified methylol group in the 4-position, which serve as end products or intermediate products.

v-Triazole compounds with substituents in the 4-position have already been described, for example in Belgian Pat. No. 695,656 or French Pat. No. 1,556,530. Various manufacturing processes can be used, depending on the nature of the substituent. However, hitherto the V-triazole compounds which are substituted by a modified methyl group in the 4-position, have not been described anywhere. The known processes are not suitable for the manufacture of such compounds.

It has now been found that simple reaction of v-triazole-3-oxides which possess a methyl group in the 4-position, with an acid anhydride yields v-triazoles which are substituted in the 4-position by an esterified methylol group. This group can be easily saponified to give the methylol group, which can then again be esterified with another acid or be reacted with $SOCl_2$ to give the chloromethyl group. The product containing the chloromethyl group can then be converted, in a manner which is in itself known, by means of an alcohol or thioalcohol into the corresponding methyl ether or methyl thioether, with an ester of phosphorous acid, in an Arbusow reaction, into a methyl phosphite, or with an amine into the correspondingly substituted aminomethyl-v-triazole.

The compounds according to the invention correspond to the formula (1) 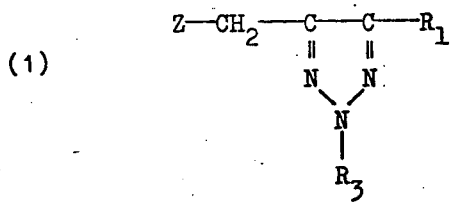

wherein Z denotes hydroxyl, benzoxy which is optionally substituted by alkyl or alkoxy with 1 to 4 carbon atoms or by halogen, alkanoyloxy with 1 to 4 carbon atoms, alkoxy or alkylmercapto with 1 to 4 carbon atoms, a dialkylamino radical with 1 to 4 carbon atoms per alkyl part, a morpholino or piperidino radical which is optionally substituted by methyl, or a dialkylphosphono radical with 1 to 4 carbon atoms per alkyl part, $R_1$ denotes alkyl with 1 to 4 carbon atoms, or phenyl which is optionally substituted by alkyl or alkoxy with 1 to 4 carbon atoms or by halogen, and $R_3$ denotes a 3-phenyl-coumarinyl-(7) group, of which the phenyl group optionally contains non-chromophoric substituents.

Compounds of particular practical interest are those of the formula (2) 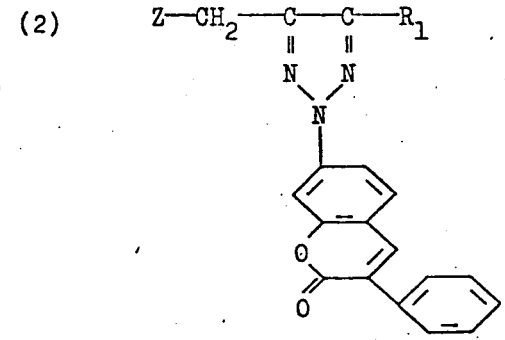

wherein Z and $R_1$ have the abovementioned meaning.

The compounds of the formulae (1) and (2) are, if appropriate, obtained according to known processes, as has been mentioned, from compounds of the formula (3) 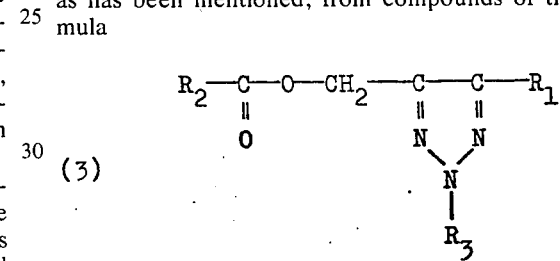

wherein $R_2$ represents alkyl with 1 to 4 carbon atoms or phenyl which is optionally substituted by alkyl or alkoxy with 1 to 4 carbon atoms or by halogen, and $R_1$ and $R_3$ have the indicated meaning, or of the formula (4) 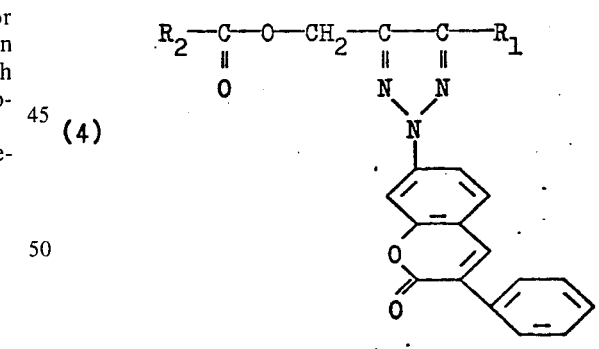

wherein $R_1$ and $R_2$ have the indicated meaning.

The process according to the invention for the manufacture of v-triazoles of the formula (3) is characterised in that a compound of the formula (5) 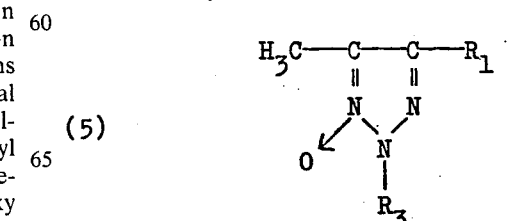

is reacted with a compound of the formula (6) 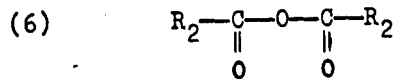

at a temperature above 100°C.

Either a stoichiometrically equivalent quantity of the compound of the formula (6) or an excess thereof can be employed for the reaction. In general, 1 to 50 mols, preferably 1 to 30 mols, of a compound of the formula (6) are employed per mol of a compound of the formula (5). The reaction is carried out in the melt or in solution, depending on the excess of the compound of the formula (6). The reaction of the compounds of the formula (5) with the compounds of the formula (6) can also be carried out in a high-boiling solvent which is inert towards the reactants such as, for example, o-dichlorobenzene and α-chloronaphthalene. The reaction is appropriately carried out at temperatures of 100° to 250°C, in most cases at temperatures of 120° to 220°C.

On saponification of the compounds of the formula (3), for example by means of a potassium carbonate solution, methylol compounds of the formula (7) 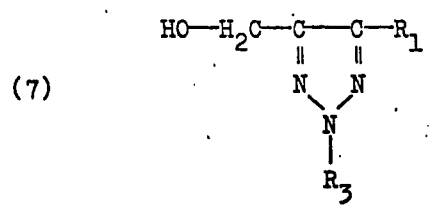

are obtained, which can be reacted by means of thionyl chloride to give compounds of the formula (8) 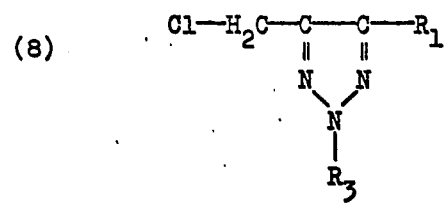

From these, further compounds, namely those of the formula (9) 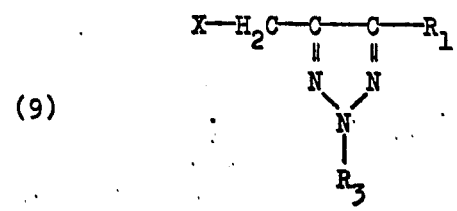

wherein X denotes the radical a) $OR_4$, b) $SR_4$, c) $-N\begin{matrix}R_5\\R_6\end{matrix}$ or d) 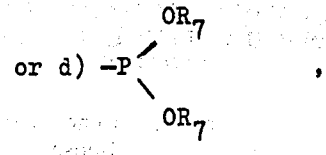

wherein $R_4$ represents an alkyl group with 1 to 4 carbon atoms or an aryl group, such as phenyl which is optionally substituted by alkyl or alkoxy with 1 to 4 carbon atoms, $R_5$ and $R_6$ represent alkyl groups, for example those with 1 to 4 carbon atoms, or together with the N represent a morpholino or piperidino ring which is optionally substituted by methyl, and $R_7$ represents an alkyl group with 1 to 4 carbon atoms, are obtained if the compounds of the formula (8) are reacted, in reactions which are in themselves known, (a) with $R_4OH$, (b) with $R_4SH$, (c) with $HNR_5R_6$ or (d) with $P(OR_7)_3$.

The starting substances for the process according to the invention, the v-triazole-3-oxides, can be obtained from compounds of the formula

(10) 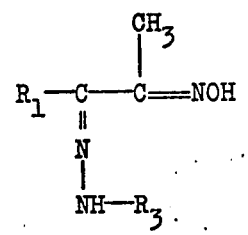

by oxidative cyclisation.

The oxidative cyclisation can be effected by the action of the most diverse oxidising agents; in doing so, it is advisable to work in solvents which are resistant to oxidation. In acid solution, for example acetic acid solution, bichromate or hydrogen peroxide are usable oxidising agents; in basic solvents, such as pyridine or pyridine-water mixtures, potassium ferricyanide can, for example, be used. The generally usable, and therefore preferred, process consists in oxidising with copper(II) sulphate in pyridine-water. In doing so, it is not necessary to employ stoichiometric amounts of copper, because the monovalent copper produced in the reaction can be constantly reconverted to the divalent level during the reaction by blowing in air or oxygen.

The compounds of the formula (10) are manufactured by reaction of compounds of the formula

(11) 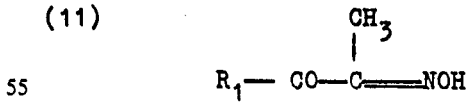

with compounds of the formula

$R_3-NH-NH_2$ (12)

The coumarine derivatives according to the invention, which are distinguished by good compatibility with high molecular, hydrophobic organic substances, are suitable for white shading of materials which can, for example, be obtained by polymerisation or polycondensation, such as polyolefines, for example polyethylene or polypropylene, and also polyvinyl chloride, but above all polyesters, especially polyesters or aromatic polycarboxylic acids with polyhydric alcohols, such as poly(terephthalic acid glycol ester), polyacrylonitrile, synthetic polyamides, such as nylon-6 and nylon-66, and also cellulose esters, such as cellulose acetates.

The optical brightening of the high molecular hydrophobic colourless organic material is, for example, effected by incorporating into it small amounts of optical brighteners according to the invention, for example 0.001 to 2%, preferably 0.01 to 1%, relative to the material to be brightened, optionally together with other substances, such as plasticisers, stabilisers or pigments. The brighteners can, for example, be incorporated into the plastics as solutions in plasticisers, such as dioctyl phthalate, or together with stabilisers, such as dibutyltin dilaurate or sodium pentaoctyl-tripolyphosphate, or together with pigments, such as, for example, titanium dioxide. Depending on the nature of the material to be brightened, the brightener can also be dissolved in the monomers before polymerisation, in the polymer composition or, together with the polymer, in a solvent. The material pretreated in this way is thereafter converted to the ultimately desired shape according to processes which are in themselves known, such as calendering, compression moulding, extrusion, spreading, casting and above all spinning and stretching. The brighteners can also be incorporated into finishes, for example into finishes for textile fibres, such as polyvinyl alcohol, or into resins or resin precondensates, such as, for example, methylol compounds of ethyleneurea, which are used for textile treatment.

Colourless, high molecular organic material can also be brightened in the form of fibres. For this, an aqueous dispersion of the v-triazoles is advantageously used. In this case, the brightener dispersion preferably contains from 0.005 to 0.5% of v-triazole, relative to the fibre material. Additionally, the dispersion can contain auxiliary substances, such as dispersing agents, for example condensation products of fatty alcohols, containing 10 to 18 carbon atoms, or of alkylphenols, with 15 to 25 mols of ethylene oxide, or condensation products of alkylmonoamines or polyamines, containing 16 to 18 carbon atoms, with at least 10 mols of ethylene oxide, organic acids, such as formic, oxalic or acetic acid, detergents, swelling agents, such as dichlorobenzenes or trichlorobenzenes, wetting agents, such as sulphosuccinic acid alkyl esters, bleaching agents, such as sodium chlorite, peroxides or hydrosulphites, and optionally brighteners of other categories, such as, for example, derivatives of stilbene which possess an affinity for cellulose.

The brightening of the fibre material with the aqueous brightener dispersion is either effected by the exhaustion process, at temperatures of, preferably, 30° to 150°C, or by the padding process. In the latter case, the goods are impregnated with a brightener dispersion, for example of 0.2 to 0.5% strength, and are, for example, finished by dry or moist heat treatment, for example by steaming at 2 atmospheres or, after drying, by brief dry heating to 180° to 220°C, the fabric being heat-set simultaneously, if appropriate. The fibre material treated in this way is finally rinsed and dried.

Colourless, high molecular, organic material which has been optically brightened in the manner described shows an attractive, pure white appearance with a blue-violet to bluish-tinged fluorescence; material of this nature which has been dyed in light colour shades and has been tinted white according to the invention is distinguished by a pure colour shade.

Detergents can also be added to the v-triazoles according to the invention, so that these can additionally be used for washing, and also for brightening, textiles. Examples of such detergents are soaps, soluble salts of high fatty alcohol sulphates, of arylsulphonic acids with higher alkyl substituents and/or several alkyl substituents, of sulpho-carboxylic acid esters of medium to higher alkanols, of higher alkanoylaminoalkyl- or -amino-arylcarboxylic or -sulphonic acids, or of fatty acid-glycerine sulphates; further examples are non-ionic detergents, such as higher alkylphenol-polyglycol-ethers. They can contain the customary fillers and auxiliary substances, for example alkali polyphosphates and alkali polymetaphosphates, alkali silicates, alkali borates, alkali salts of the carboxymethyl-celluloses, foam stabilisers, such as alkanolamines, higher fatty acids or complexones, such as soluble salts of ethylenediamine-tetraacetic acid, and chemical bleaching agents, such as perborates or percarbonates.

The brighteners are incorporated into the detergents or into washing liquors, appropriately in the form of their solutions in neutral organic solvents which are miscible with water and/or are easily volatile, such as lower alkanols, lower alkoxyalkanols or lower aliphatic ketones. They can, however, also be used in a finely divided solid form, by themselves or mixed with dispersing agents. They can, for example, be mixed, kneaded or ground with the detergent substances, and the customary auxiliaries and fillers can then be mixed in. The brighteners are, for example, stirred with the detergent substances, customary auxiliaries and fillers, and water, to give a slurry, and this is then sprayed in a spray drier. It is also possible to mix the v-triazole derivatives with finished detergents, for example by spraying a solution in an easily volatile and/or water-soluble organic solvent onto the dry, agitated detergents.

The content of optical brightener in the detergents is advantageously 0.001 to 0.5%, relative to the solids content of the detergent. Such detergents containing optical brighteners frequently possess a greatly improved white appearance in daylight as compared to detergents which are free of brightener.

Washing liquors which contain optical brighteners manufactured according to the invention, or compounds derived therefrom by modification, on washing impart a brilliant appearance in daylight to the textile fibres treated therewith, for example synthetic polyamide, polyester, polyolefine, polyacrylonitrile and cellulose ester fibres. They can therefore especially be used for washing these synthetic fibres or the textiles or components of textiles consisting of such fibres, and for washing laundry. For use in household laundry, they can also contain yet further optical brighteners which possess an affinity for other fibres, for example for cellulose.

EXAMPLE 1

39.5 g of 2-[3-phenylcoumarinyl-(7)]-4-methyl-5-phenyl-v-triazole-3-oxide and 30.0 g of benzoic anhydride are intimately mixed and heated to 200°C for 8 hours. Thereafter this reaction mixture is dissolved in 200 ml of hot toluene. On cooling the toluene solution, a crystalline precipitate is formed, which is filtered off, washed with acetone and recrystallised from toluene using decolourising charcoal. The benzoic acid ester of the formula

(13) 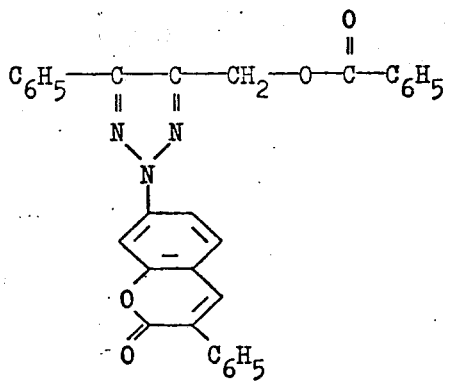

is thus obtained in the form of light yellow crystals, which melt at 209° to 210°C and dissolve in chlorobenzene to give an intense blue-violet fluorescence.

The substance is capable of optically brightening polyesters, polyamides, cellulose esters, polyvinyl chloride, polyacrylonitrile and polyolefines.

The compounds of the general formula (14) listed in the table which follows, which can also be used for white toning of the same plastics, are manufactured from the corresponding triazole oxides in an analogous manner to that described above.

General formula for the compounds manufactured:

(14) 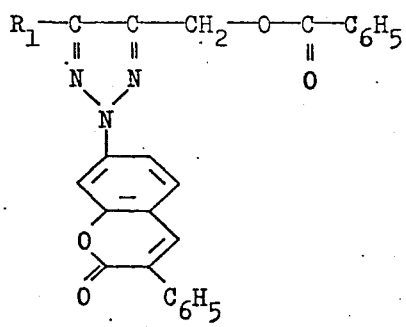

EXAMPLE 2

33.3 g of 2-[3-phenylcoumarinyl-(7)]-4,5-dimethyl-v-triazole-3-oxide in 300 ml of acetic anhydride are boiled for 48 hours under reflux. On cooling this reaction mixture, some unchanged starting material separates out and is filtered off. The mother liquor is evaporated to dryness. Yellow crystals are thereby obtained, which are recrystallised from glacial acetic acid and from toluene, using decolourising charcoal. The compound of the formula

(20) 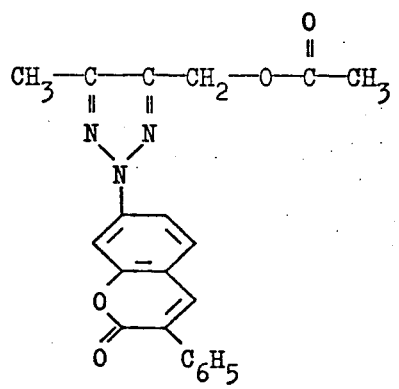

is thus obtained in the form of pale yellow crystals, which melt at 171° to 172°C and dissolve in chlorobenzene to give an intense blue-violet fluorescence.

The compound is used for the optical brightening of polyesters, polyamides, cellulose esters, polyacrylonitrile, polyvinyl chloride and polyolefines.

The compounds of the formulae (13) to (20) can be saponified to give the corresponding alcohols of the general formula (21):

| Formula No. | $R_1$ | Melting point °C |
|---|---|---|
| (15) | —CH$_3$ | 194 – 195 |
| (16) | —⟨⟩—CH$_3$ | 213 – 214 |
| (17) | —⟨⟩—OCH$_3$ | 224 – 225 |
| (18) | —⟨⟩—Cl | 205 – 206 |
| (19) | CH$_3$—⟨⟩—CH$_3$ | 174 – 175 |

(21) 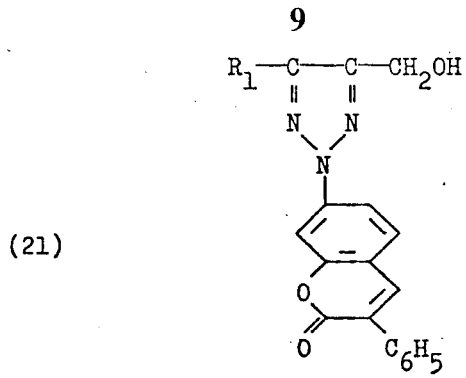

is thus obtained in the form of light yellow crystals, which melt at 186° to 188°C and dissolve in chlorobenzene to give a blue-violet fluorescence.

The compounds of the formulae (23) to (27) [general formula (21)] listed in the table which follows are manufactured from the compounds of the formulae (15) to (20) in an analogous manner to that described above.

The compounds are also valuable optical brighteners, especially for polyamides, polyesters, and cellulose acetates.

| Formula No. | $R_1$ | Melting point °C |
|---|---|---|
| (23) | $CH_3-$ | 232 - 233 |
| (24) | $CH_3-\langle\!\!\bigcirc\!\!\rangle-$ | 218 - 220 |
| (25) | $H_3CO-\langle\!\!\bigcirc\!\!\rangle-$ | 224 - 225 |
| (26) | $Cl-\langle\!\!\bigcirc\!\!\rangle-$ | 199 - 200 |
| (27) | $\begin{array}{c}CH_3\\ \langle\!\!\bigcirc\!\!\rangle-\\ CH_3\end{array}$ | 187 - 189 |

For example, 120.0 g of the compound of the formula (13) in 1000 ml of ethylene glycol are warmed to 130°C whilst stirring. 50 ml of a 50% strength aqueous solution of potassium carbonate are added dropwise at this temperature over the course of 3 hours. This reaction mixture is now stirred for a further 12 hours at 130°C and is thereafter cooled. A yellow crystalline precipitate forms, which is filtered off and washed with water. The resulting crystals are twice recrystallised from toluene, using decolourising charcoal. The compound of the formula

(22) 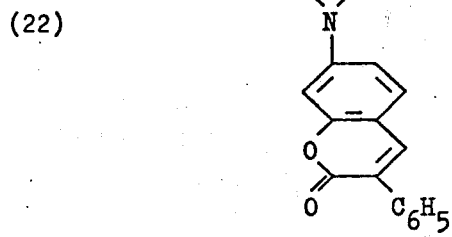

They can be re-esterified, for which the following procedure can be adopted:

10.0 g of the compound of the formula (22) in 50 ml of acetic anhydride are boiled for 6 hours under reflux. On cooling this reaction mixture, yellow crystals are obtained, which are filtered off and recrystallised using decolourising charcoal. The crystals thus obtained of the compound of the formula

(28) 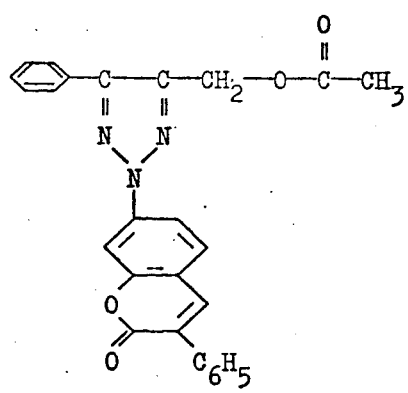

dissolve in chlorobenzene to give an intense blue-violet fluorescence and melt at 175° to 176°C.

The compounds of the formulae (30) to (34) [general formula (29)] can be manufactured analogously from the compounds of the formulae (24) to (27). To manufacture the compound of the formula (34), butyric anhydride is used instead of acetic anhydride.

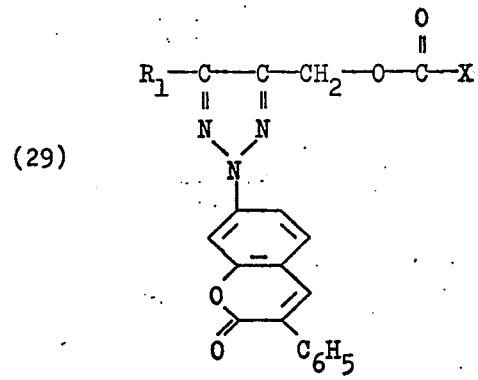

(29)

For example, 55.0 g of thionyl chloride are added dropwise, over the course of 1 hour, to a solution of 65.4 g of the compound of the formula (22) in 500 ml of dry chlorobenzene at 60° to 70°C. This reaction mixture is further stirred at 70°C until the evolution of hydrogen chloride gas has ceased. Thereafter, the solution obtained is evaporated to dryness and the yellow, crystalline residue is recrystallised from toluene, using decolourising charcoal. The compound of the formula

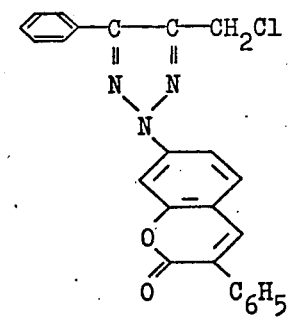

(36)

| Formula No. | $R_1$ | X | Melting point °C |
|---|---|---|---|
| (30) | $CH_3-\langle\bigcirc\rangle-$ | $-CH_3$ | 173 - 174 |
| (31) | $Cl-\langle\bigcirc\rangle-$ | $-CH_3$ | 174 - 176 |
| (32) | $Cl-\langle\bigcirc\rangle-$ | $-CH_3$ | 258 - 260 |
| (33) | $\begin{array}{c}CH_3\\ \langle\bigcirc\rangle-\\ CH_3\end{array}$ | $-CH_3$ | 160 - 161 |
| (34) | $H_3C-\langle\bigcirc\rangle-$ | $-CH_2CH_2-CH_3$ | 150 - 151 |

A reaction of the compounds of the general formula (21) [compounds of the formulae (22) to (27)] with thionyl chloride yields the compounds of the general formula

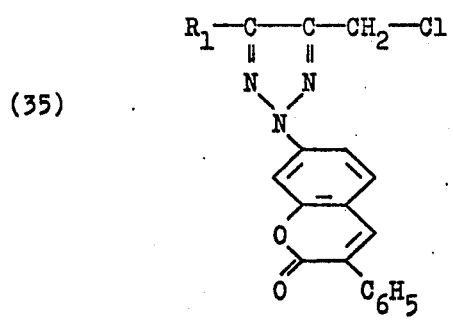

(35)

is thus obtained in the form of pale yellow crystals which melt at 193° to 194°C.

Using an analogous procedure, the compounds of the formulae (37) to (40) [general formula (35)], listed in the table below, are obtained from the compounds of the formula (23) to (26).

These compounds can again be used for optical brightening, for example of polyesters.

Ethers, amines and phosphoro-acetic (sic!!) acid esters can be manufactured from the compounds of the general formula (35). These reactions will be described in more detail below, by way of example, for the compound of the formula (36).

A. 8.3 g of the compound of the formula (36) are suspended in 100 ml of dry methanol. A solution of 1.1 g of sodium methylate in 20 ml of methanol is added

| Formula No. | $R_1$ | Melting point °C |
|---|---|---|
| (37) | $CH_3-$ | 208 – 209 |
| (38) | $H_3C-\langle\rangle-$ | 193 – 194 |
| (39) | $H_3CO-\langle\rangle-$ | 214 – 215 |
| (40) | $Cl-\langle\rangle-$ | 225 – 226 | dropwise to this suspension at room temperature over the course of one hour, and the reaction mixture is stirred for 3 hours at room temperature and therafter boiled for 8 hours under reflux. The crystalline precipitate is filtered off, washed with methanol and a little water, dried and twice recrystallised from toluene. The light yellow crystals thus obtained of the compound of the formula

(41)
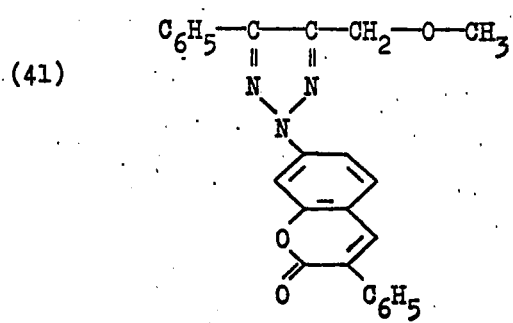

melt at 183° to 184°C. The compound serves as a brightener for polyamides and polyesters.

B. 12.0 g of the compound of the formula (36) and 5.4 g of morpholine in 250 ml of dry xylene are heated for 4 hours under reflux. This reaction mixture is filtered hot and the filtrate is evaporated to dryness. The solid, yellow residue is twice recrystallised from toluene. The compound of the formula

(42)
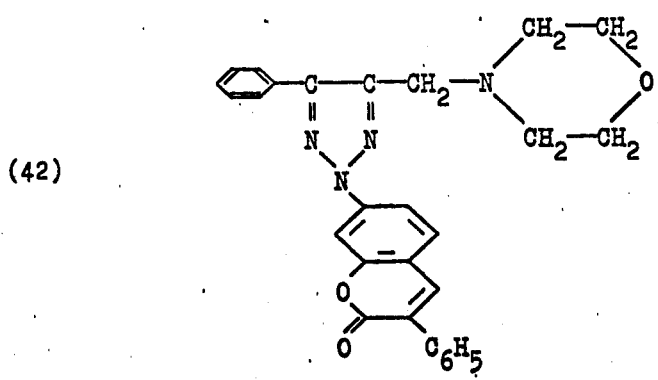

is thus obtained in the form of pale yellow crystals which dissolve in chlorobenzene to give an intense blue-violet fluorescence; melting point: 175° to 176°C. The compound is capable of brightening polyamides and polyacrylonitrile.

Using an analogous procedure to that described here, the chloromethyl compounds of the formulae (37), (39) and (40) together with the appropriate amines yield the compounds of the formulae (44) to (50) of the general formula

(43)
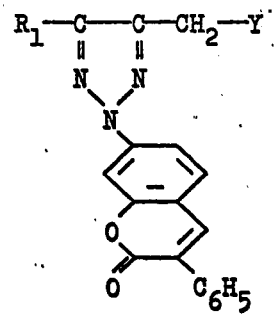

which are given in the table below:

| Formula No. | R₁ | Y | Melting point °C |
|---|---|---|---|
| (44) | $C_6H_5-$ | -N(CH₃)₂ ring with O (2,6-dimethylmorpholino) | 168 - 170 |
| (45) | $C_6H_5-$ | -N piperidino | 170 - 172 |
| (46) | $C_6H_5-$ | -N(CH₃)₂ | 174 - 175 |
| (47) | $CH_3-$ | -N morpholino | 159 - 160 |
| (48) | $CH_3-C_6H_4-$ | -N morpholino | 233 - 234 |
| (49) | $CH_3-C_6H_4-$ | -N(CH₃)₂ | 150 - 151 |
| (50) | $H_3CO-C_6H_4-$ | -N morpholino | 185 - 186 |

C. 8.26 g of the compound of the formula (36) in 43.0 g of tributyl phosphite are warmed to 210° to 230°C. As soon as no further butyl chloride distils off, the yellow solution obtained is stirred into 300 ml of n-hexane. The yellow crystals which separate out are filtered off and twice recrystallised from ligroin, using decolourising charcoal. The compound of the formula

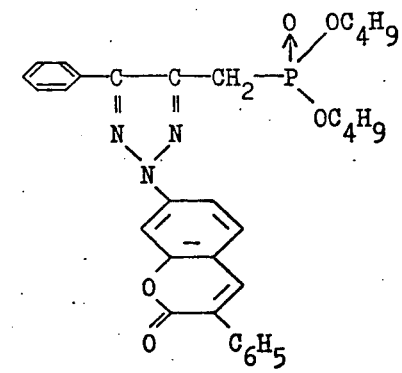

(51)

is thus obtained in the form of pale yellow crystals which melt at 99° to 101°C.

Following the same procedure as described above, the compounds of the formulae (37), (39) and (40) yield the compound of the formulae (53) to (55) of the general formula

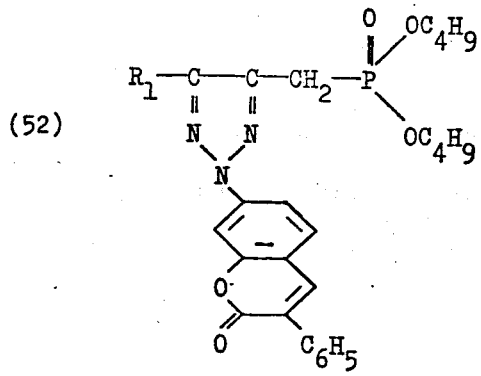

(52)

| Formula No. | $R_1$ | Melting point °C |
|---|---|---|
| (53) | $CH_3-$ | 88 – 89 |
| (54) | $CH_3-\langle\rangle-$ | 114 – 116 |
| (55) | $H_3CO-\langle\rangle-$ | 115 – 117 |

All these compounds can be used as brighteners for plastics, such as polyesters.

EXAMPLE 3

1 g of the optical brightener of the formula (22) is dissolved in 1000 ml of ethylene glycol monoethyl ether. 1.8 ml of this stock solution are added to 100 ml of water which contains 0.12 ml of 85% strength formic acid and 0.06 g of octadecyl alcohol pentadecaglycol ether. This treatment bath is warmed to 60°C, 3 g of a nylon staple fabric are then added to it, the temperature is raised to 90° – 92°C over the course of 10 to 15 minutes, and the bath is left for 30 minutes at this temperature. The fabric is rinsed and dried. The fabric treated in this way has a white, brilliant appearance.

EXAMPLE 4

0.2 g of trichlorobenzene are added to 100 ml of water and mixed with a solution of 0.003 g of the triazole derivative of the formula (13) in 3 ml of ethylene glycol monoethyl ether. The liquor thus obtained is warmed to 60°C and 3 g of a polyester fabric are introduced into it. The temperature is raised to 95° – 98°C over the course of 10 to 15 minutes and left thereat for 1 hour. The fabric is thereafter rinsed and dried. The treated fabric has a white, brilliant appearance, If the procedure indicated in the above example is followed, but instead of the brightener mentioned therein a v-triazole of the formulae (15) to (19) is used, similar results are obtained.

EXAMPLE 5

Using a stainless steel autoclave which is equipped with a stirrer, a gas inlet tube, a vacuum device, a descending condenser, a bottom nozzle which can be closed, an inlet valve and a heating jacket, 388 g of benzene-1,4-dicarboxylic acid dimethyl ester, 300 g of 1,2-ethanediol and 0.4 g of antimony oxide are heated to 200°C external temperature, whilst blowing pure nitrogen through, and are kept for 3 hours at this temperature. At the same time, methanol is slowly distilled off. 0.2 g of 2-[3-phenylcoumarinyl-(7)]-4-methyl-5-benzoyloxymethyl-v-triazole [formula (15)] dissolved in 40 g of 1,2-ethanediol are now carefully introduced into the autoclave, with exclusion of air, after having allowed the temperature to drop to 190°C. After completion of the addition, the temperature is raised to 285°C external temperature over the course of 1 hour, in the course of which 1,2-ethanediol distils off. Thereafter a vacuum is applied to the autoclave, the pressure is slowly reduced to 0.2 mm Hg, and the condensation is completed over the course of 3 hours under these conditions. During these operations the mixture is well stirred. The liquid condensation polymer is then forced out through the bottom nozzle by means of nitrogen. Rods, strips or monofilaments can be manufactured from the polymers thus obtained. The polyester monofilaments obtained in this manner have a brilliant white appearance.

EXAMPLE 6

1000 parts of polyester granules of poly(terephthalic acid glycol ester) are intimately mixed with 0.3 part of the v-triazole of the formula (15) and fused at 285°C whilst stirring. After spinning the melt through customary spinnerets under a nitrogen excess pressure of 2 to 3 atmospheres gauge, intensely brightened polyester fibres are obtained. The white effects thus obtained show good fastness to washing and to light.

Similarly good white effects are obtained with the compounds of the formulae (16) to (19).

EXAMPLE 7

0.12 ml of 85% strength formic acid and 0.06 g of Tinegal NA (= alkylpolyglycol ether) are added to 100 ml of water.

A solution of the optical brightener of the formula (42) is prepared by dissolving 1 g in 1000 ml of methylcellosolve. 1.5 ml of this stock solution are added to the solution described above. The liquor thus obtained is warmed to 60°C. A polyacrylonitrile fabric weighing 3 g is then added thereto. The temperature is raised to 95° – 98°C over the course of 10 to 15 minutes and is left thereat for 60 minutes. The fabric is then rinsed for 2 minutes in running cold water and is subsequently dried for 20 minutes at 60°C.

The fabric treated in this way shows a distinct brightening effect.

Similarly good white effects are also obtained with the compounds of the formulae (44) to (50).

EXAMPLE 8

0.06 ml of 40% strength acetic acid and 0.06 ml of Tinegal NA (= alkylpolyglycol ether) are added to 95 ml of water.

A solution of the optical brightener of the formula (22) is prepared by dissolving 1 g in 1000 ml of methylcellosolve. 6 ml of this stock solution are added to the solution described above. The liquor thus obtained is warmed to 40°C, and an acetate fabric (for example 2½-acetate or triacetate) weighing 3 g is then added thereto. The temperature is raised to 75° – 80°C over the course of 10 to 15 minutes and is left thereat for 30 minutes. The fabric is then rinsed for 2 minutes in running cold water and is subsequently dried for 20 minutes at 60°C.

The fabric treated in this way shows a distinct brightening effect. If, otherwise following the same procedure, the compound of the formula (13), (16) or (24) is used instead of the compound of the formula (22), good brightening effects are again obtained.

What is claimed is:

1. A v-triazole of the formula

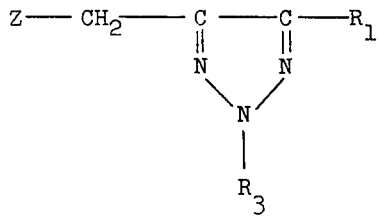

wherein Z is hydroxyl, benzoxy, benzoxy substituted by alkyl with 1 to 4 carbon atoms or by alkoxy with 1 to 4 carbon atoms or by halogen, alkanoyloxy with 1 to 4 carbon atoms, alkoxy with 1 4 carbon atoms, or alkylmercapto with 1 to 4 carbon atoms, $R_1$ is alkyl with 1 to 4 carbon atoms, phenyl, phenyl substituted by alkyl with 1 to 4 carbon atoms or by alkoxy with 1 to 4 carbon atoms or by halogen, and $R_3$ is a 3-phenylcoumarinyl-(7) group.

2. A v-triazole of claim 1, wherein Z is an alkanoyloxy group of the formula

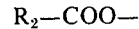

and wherein $R_1$ and $R_2$ are selected from the group consisting of alkyl with 1 to 4 carbon atoms, phenyl, and phenyl which is substituted by alkyl with 1 to 4 carbon atoms or by alkoxy with 1 to 4 carbon atoms or by halogen.

3. A v-triazole according to claim 1 wherein $R_3$ is the 3-phenylcoumarinyl-(7) group.

4. A v-triazole according to claim 2 wherein $R_3$ is the 3-phenylcourmarinyl-(7) group.

5. The compound according to claim 1, of the formula

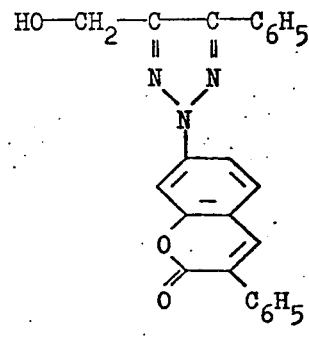

6. The compound according to claim 1, of the formula

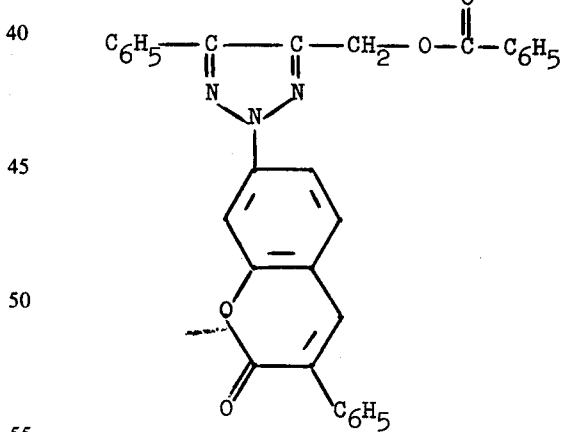

* * * * *